United States Patent [19]

Magnoni

[11] Patent Number: 5,031,296
[45] Date of Patent: Jul. 16, 1991

[54] MACHINE TOOL FOR MANUFACTURING PULLEYS OR WHEELS

[75] Inventor: Franco Magnoni, Modena, Italy

[73] Assignee: S.C. S.R.L., Nonantola, Italy

[21] Appl. No.: 523,037

[22] Filed: May 14, 1990

[51] Int. Cl.⁵ .......................... B23P 23/00; B21H 1/02
[52] U.S. Cl. .................................... 29/33 R; 29/892.3; 72/83; 72/85
[58] Field of Search ..................... 29/892, 892.2, 892.3, 29/33 R, 34 R, 33 J, 33 T; 72/82, 83, 84, 85, 90, 96, 97, 109, 87

[56] References Cited

U.S. PATENT DOCUMENTS

| | | | |
|---|---|---|---|
| 3,852,863 | 12/1974 | Killian | 29/892.3 |
| 3,962,896 | 6/1976 | Bichel | 72/82 |
| 4,055,977 | 11/1977 | Haswell et al. | 72/84 |
| 4,134,285 | 1/1979 | Iaconetti et al. | 29/892.3 |
| 4,297,869 | 11/1981 | Oldford | 29/892.3 X |
| 4,633,557 | 1/1987 | Kanemitsu | 29/892.3 |
| 4,766,752 | 8/1988 | Gronert et al. | 72/84 |

FOREIGN PATENT DOCUMENTS

| | | | |
|---|---|---|---|
| 3204668 | 8/1983 | Fed. Rep. of Germany | 72/84 |
| 159047 | 2/1983 | German Democratic Rep. | 72/83 |
| 212830 | 12/1983 | Japan | 29/892.3 |
| 64132 | 4/1984 | Japan | 29/892.2 |

Primary Examiner—William Briggs
Attorney, Agent, or Firm—Darby & Darby

[57] ABSTRACT

The invention relates to a machine tool, in particular for the manufacturing, from sheet metal of mechanical parts such as pulleys, wheels and similar.

It comprises a first chuckhead quill (4) rotatably mounted to a sturdy frame (1) and having coaxially and independently housed inside it a toolhead spindle (7) which can be commanded to slide in axial direction with respect to said quill (4). A second chuckhead quill (20) is exactly contra-positioned with respect to the first (4) and is rotatably mounted to a support element (18) which is slidably mobile in a direction parallel to its axis and which is slidably commanded by a powerful coaxial hydraulic jack (23). A second toolhead spindle (21) is coaxially disposed inside said second quill (20) with freedom to slide axially with respect to said quill (20).

10 Claims, 5 Drawing Sheets

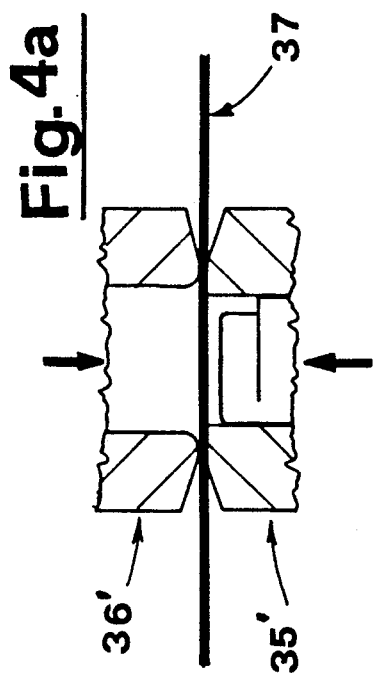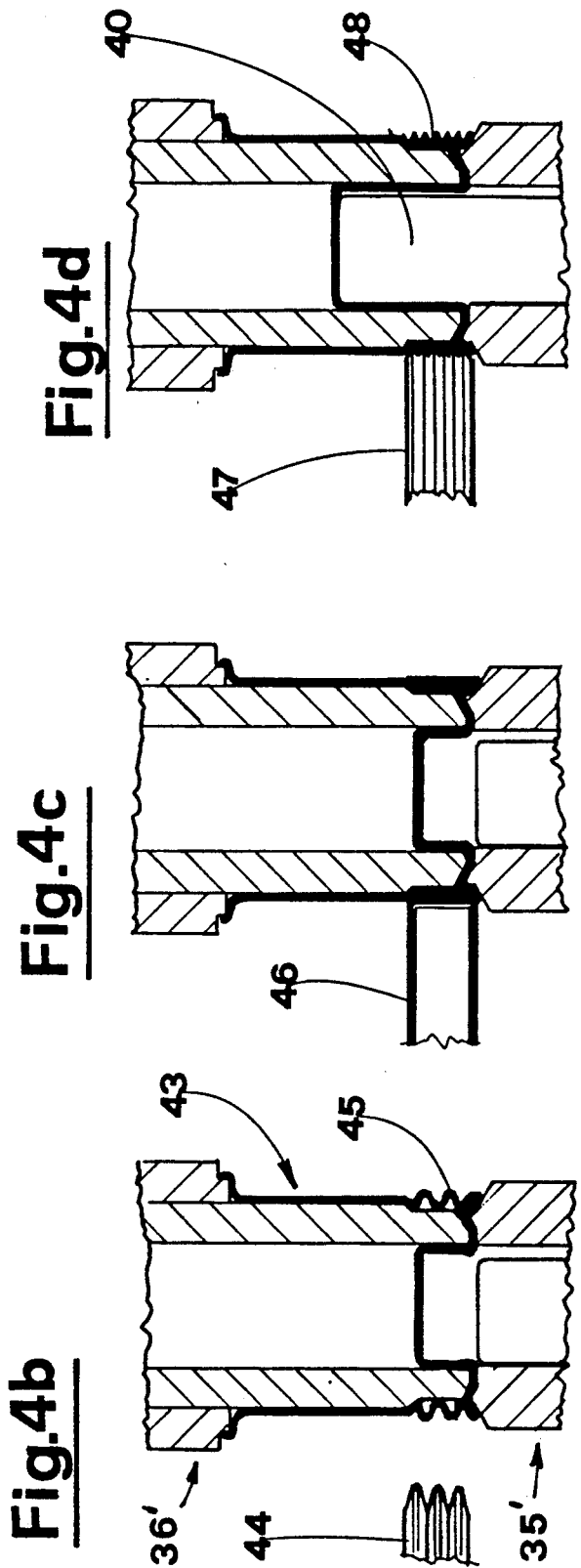

1

MACHINE TOOL FOR MANUFACTURING PULLEYS OR WHEELS

SUMMARY OF THE INVENTION

The invention relates to a machine tool, in particular for the manufacturing, from sheet metal, of mechanical parts such as pulleys, wheels and similar.

The object of the present invention is to provide a machine which, working on the blank, constituted of sheet metal, can perform a plurality of different plastic deformation operations (deep-drawing, roll-forming, etc.) and shaving operations (turning, boring, etc.) without having to move or re-position the piece.

Added to this advantage of permitting the performing of several different kinds of operation, through plastic deformation or through shaving without having to move or reposition the piece, is the versatility of the present machine, capable of performing thus a large range of different operations.

The abovenamed advantages are gained by a machine tool, in particular for the manufacturing from sheet metal of mechanical parts such as pulleys, wheels and similar, as it is described in the claims which follow.

BRIEF DESCRIPTION OF THE DRAWINGS

Further characteristics and advantages of the present invention will appear in the detailed description which follows, which is of a preferred but not exclusive embodiment of the invention, represented in the accompanying illustrations by way of example and not in a unique embodiment:

FIGS. 4a, 4b, 4c, 4d, 4e, 4f, 4g, 4h show some of the stages in the operations performed by the invention.

DESCRIPTION OF A PREFERRED EMBODIMENT

Figure 1A:
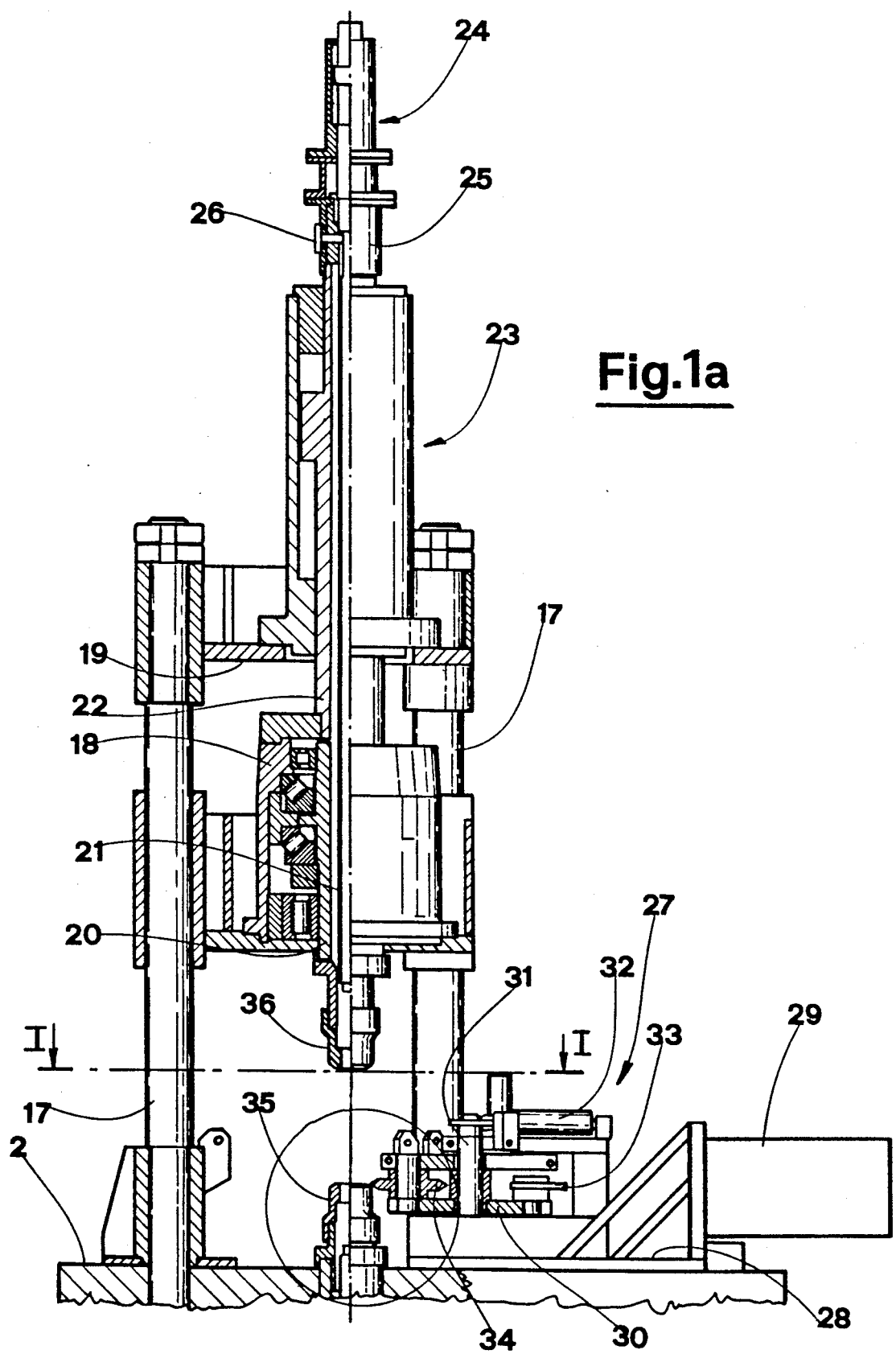
FIGS. 1a and 1b show, from the same schematic frontal view, partially sectioned according to plane II—II (as represented in FIG. 2), respectively the upper and lower parts of the machine tool.
Figure 1B:
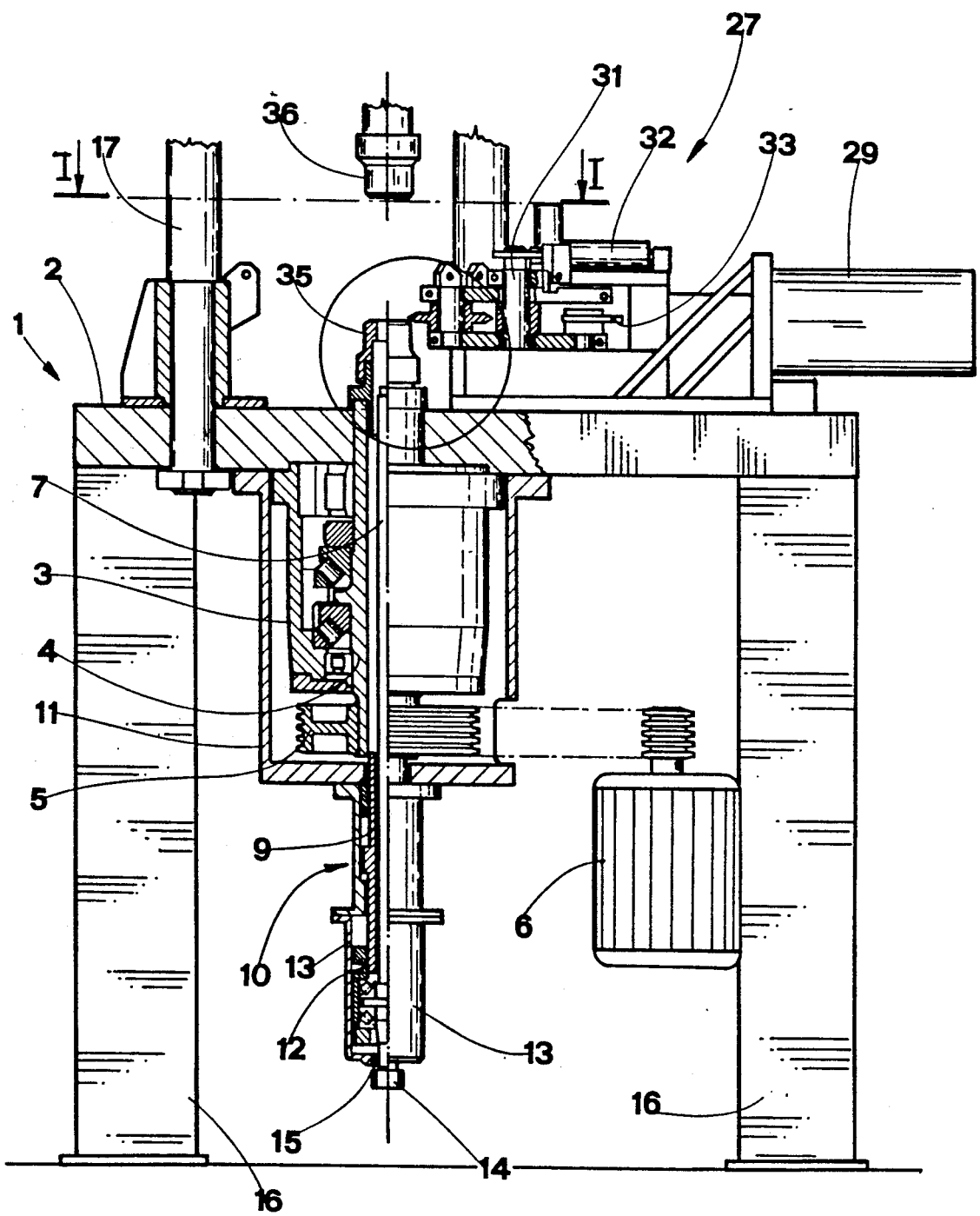
Figure 2:
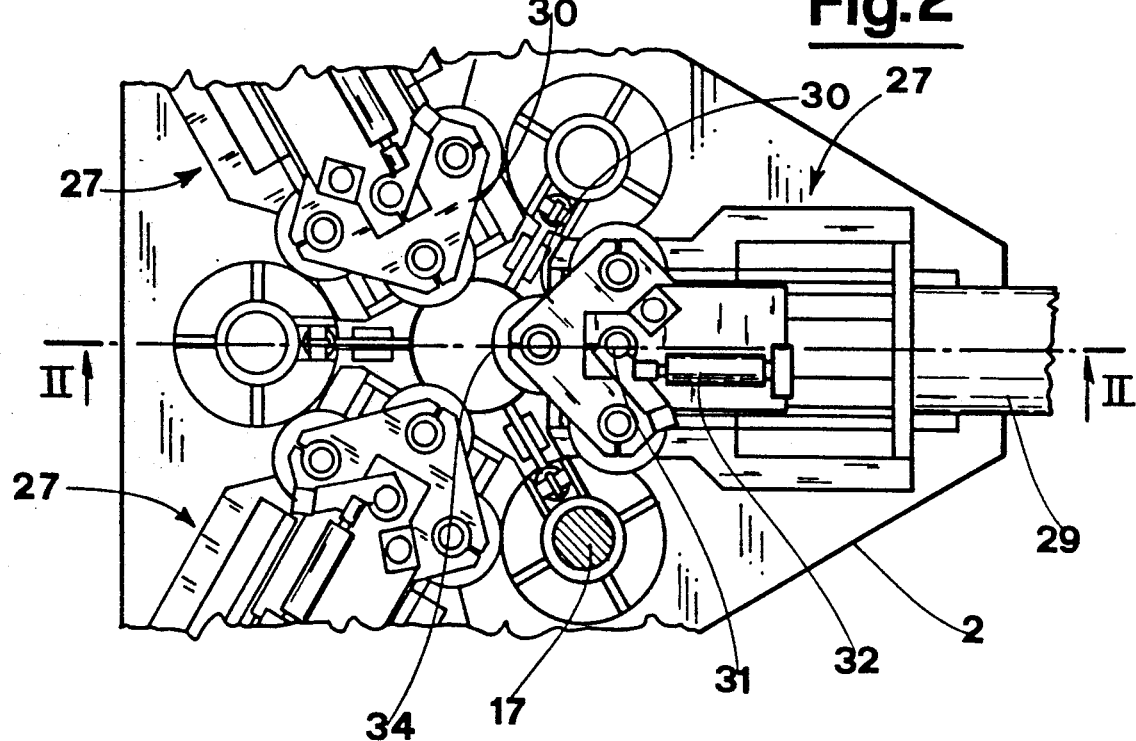
FIG. 2 shows a schematic section made according to plane I—I of FIGS. 1a and 1b.
Figure 3:
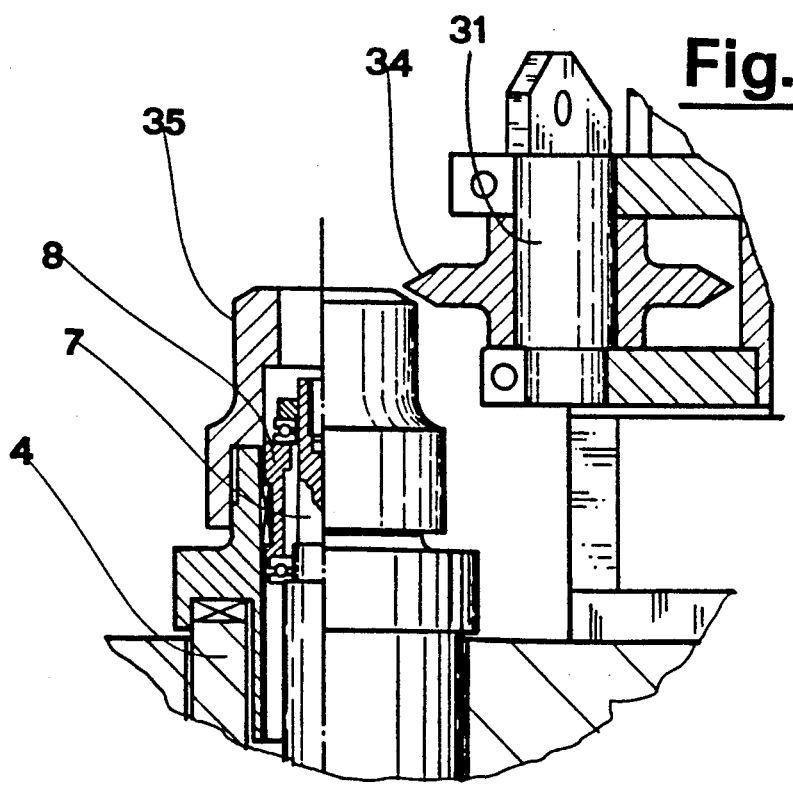
FIG. 3 shows, in enlarged scale, the detail which is indicated by a circle in FIGS. 1a and 1b.

With reference to the drawings, FIG. 1 denotes the sturdy frame (1) comprising a horizontal deck (2), below and mounted to which is a support (3), to which in turn is rotatably mounted a chuckhead quill (4) with verticle axis. A pulley (5) is fitted to the quill (4), being a component of the mechanical chain-drive transmission via which same quill is rotated by a motor (6). Internally to the quill (4) is mounted a toolhead spindle (7) exhibiting at its top end a threaded mount for the attachment of a tool or toolhead. Said spindle (7) is rotatably housed inside a sleeve (8), which is in its turn free to slide axially inside the quill (4). At its bottom end the spindle (7) is secured to the tubular stem (9) of a coaxial annular section hydraulic cylinder (10), and is thus slidably constrained. The cylinder (10) is mounted to the box (11), which is solidly mounted to the deck (2), and has the purpose of producing the axial movements of the spindle (7), which is rotatably housed at its bottom end inside a barrel (12), in its turn able to slide freely in an axial direction with respect to the body (13). The bottom end of the spindle (7) exhibits a projection (14) of appropriate axial length, which, together with a corresponding sliding seat (15) shaped into the body (13) constitutes an axially-sliding pair. On the deck (2), which stands on the floor on sturdy, posts (16), the bases of three guide columns (17) are mounted, parallel to the axis of the coaxial quill (4) and spindle (7): on these guide columns (17) is mounted a strong support element (18), which is slidably mobile in an axial direction. At their top ends, the guide columns (17), which are disposed as in the corners of an equilateral triangle, with the quill (4) at their center, are permanently connected by means of a strong joining element (19). To the support element (18) is rotatably mounted a chuckhead quill (20) internally to which, in exactly the same way as for spindle (7) housed internally to quill (4), a second toolhead spindle (21) is housed. Like spindle (7), spindle (21) is also rotatably mounted inside a coaxial barrel, which in turn is free to slide in an axial direction within the quill (20). The support element (18) is secured to the bottom end of the tubular stem (22) of a powerful hydraulic jack (23), which is disposed coaxially with respect to shafts (20) and (21) and is perfectly aligned with the axis of shafts (4) and (7). The jack (23) is of annular section and its body is solidly fixed to the element (19). At its top end the spindle (21) is fixedly connected to the tubular stem of a coaxial hydraulic cylinder (24), whose body is fixedly solid to the hydraulic jack (23) with tubular elements (25) interposed. A movable sliding pair (26) is positioned between the element (25) and the part of the spindle (21) housed inside it to permit the same spindle (21) to slide freely only in an axial direction with respect to the quill (20). The bottom ends of quills (4) and (20), positioned so that they are exactly facing one another, are each capable of holding chucks. Arranged on the deck (2) at angularly equidistant positions with respect to the guide columns (17), are three mobile cross-sliding tool rests (27) which are slidably mounted on fixed slides (28), in three radial directions with respect to the common axis of quills (4) and (20) and spindles (7) and (21). Each tool rest (27) is moved slidably along its slide (28) by action of a hydraulic cylinder (29). Each tool rest is fitted with a toolhead or turret (30) rotatably mounted on a pivot whose axis is parallel to those of quills (4) and (20) and spindles (7) and (21). The rotation of the turret (30) around the pivot (31) is commanded via a small hydraulic cylinder (32). Each turret can bear several tools. In this embodiment rotating tools (34) for roll-forming or cutting, and fixed tools for turning (33), are used.

A hollow chuck (35) is mounted to the top end of the quill (4). A similar hollow chuck (36) is mounted to the bottom end of the second quill (20). The blank, flat or in a previously deep-drawn hollow axial-symmetric shape, is clamped between the two chucks and held in position between them by means of the considerable force exerted by the hydraulic cylinder (23). With the blank held tight in this way, the selected tools on the toolheads ot turrets (30), which are positioned on the tool rests (27), can perform their tasks, as may the tools or toolheads which can be mounted respectively on the top end of the spindle (7) and the bottom end of the spindle (21), if this is required.

Figure 4E:
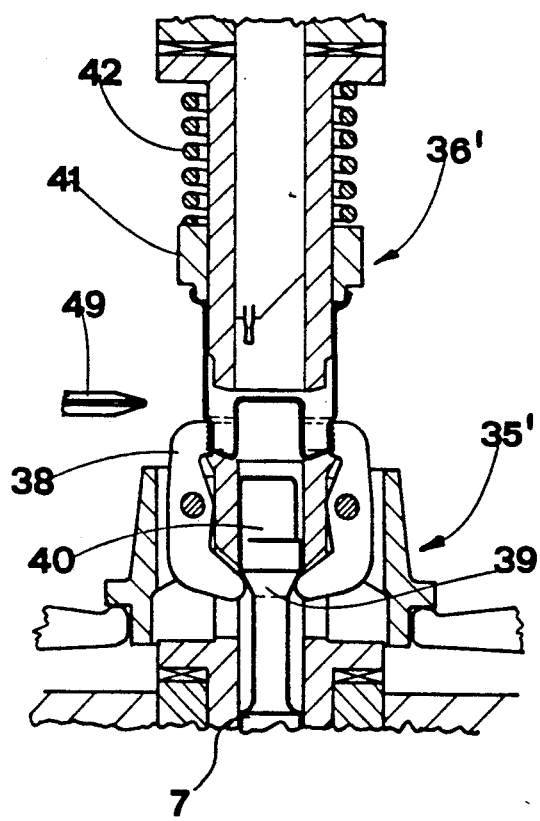
Figure 4F:
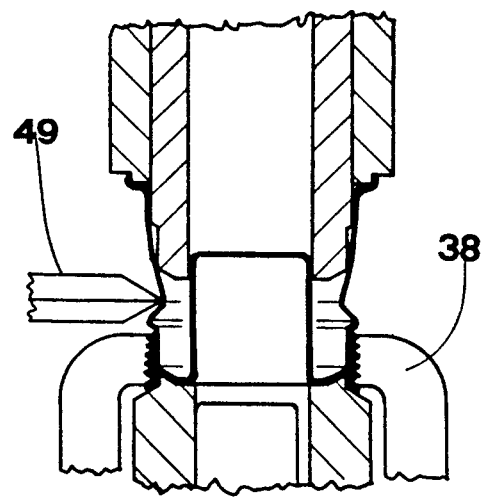
Figure 4G:
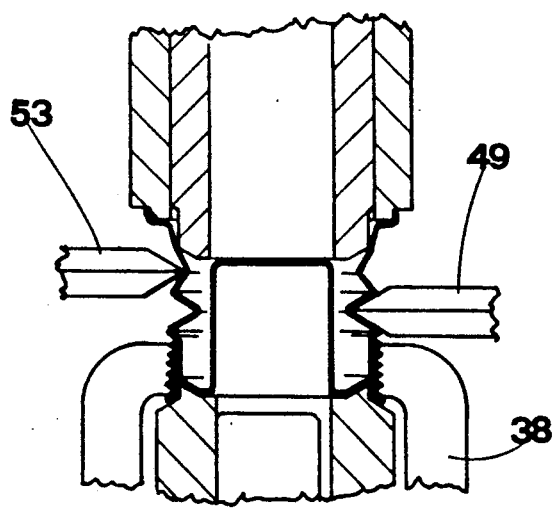
Figure 4H:
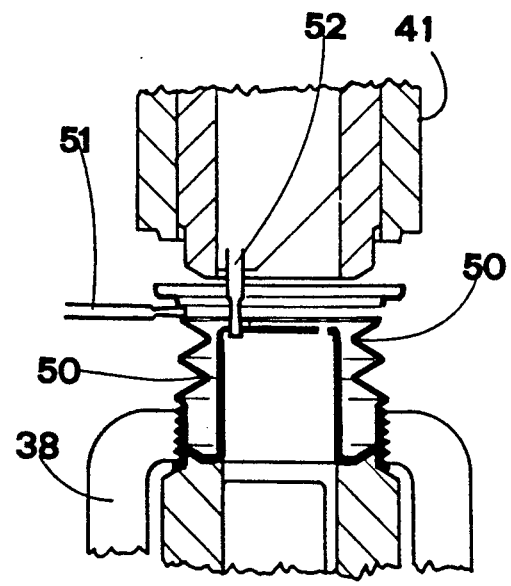

The machine, equipped with the appropriate tools, may be used in the performing of a wide selection of tasks, and in particular in the manufacturing of mechanical parts for motor transmission. By way of example, in FIGS. 4a, 4b, 4c, 4d, 4e, 4f, 4g, 4h, some of the most significant phases of a work cycle are represented, in which a sheave for chain-driven transmission is manufactured out of a flat metal sheet of constant thickness (37). At the top end of the quill (4), a hollow chuck (35) is mounted, which is equipped with a self-centering three-jaw device (38) for the external gripping of the blank. Said self-centering device (38) is operated by means of the axial movements of a centering piece (39) attached to the end of the toolhead spindle (7), which interacts directly with the jaws of the self-centering device (38). Said self-centering device has at its top end a punch (40). At the bottom end of quill (20) a hollow chuck (36) is mounted, around which a coaxial annular mobile element (41) is externally and coaxially positioned: this element is pushed in a downward direction by the pressure of a spring (42). By action of the roll-forming tools (44) mounted on the toolhead or turret (30) of one of the sliding toolrests (27), the blank (43) (previously coaxially deep-drawn on the chuck (36)) can undergo a series of plastic deformations aimed at producing a corrugation (45) in the part of the blank where successively small "V" grooves (48) will be formed. Next, using another roll-forming tool (46), the corrugations (45) are crushed in a radial direction so that a cylindrical area is obtained where the thickness of the blank notably increased with regard to previously, as shown in FIG. 4c. By means of still another roll-forming tool (47), the "V" grooves (48) are formed, while, commanded by the hydraulic cylinder (10), the spindle (7) thrusts the punch (40) upwards, completing the formation of the internal part of the blank, which will constitute the hub of the pulley. The formation of the small "V" grooves being thus completed, the self-centering jaw device (38) is activated at the same time as the punch (40) is lowered. Then the chuck (36) is raised by action of the jack (23) so that the rolling tools (49) and (53) can make, one after the other, their two grooves (50) for V-belts. At completion of the rolling operations, a cutting-off tool (51) mounted on a toolrest (27) and a cutter-reamer (52) mounted on a toolhead fixed on the bottom end of the toolhead spindle (21), are brought into use. When these operations are completed, the rotation of the quill (4) is stopped and the finished piece can now be removed from the self-centering jaw device (38) by raising the spindle (7) and thus opening the jaws.

What is claimed is:

1. A machine tool, in particular for the manufacturing, from sheet metal, of mechanical parts such as pulleys, wheels and similar, comprising:
  a sturdy frame (1);
  the first of two chuckhead quills (4) with vertical axis, rotatably mounted to said frame (1), having internally and coaxially mounted to it a toolhead spindle (7) which is independent of rotation with respect to said quill (4) and which is slidably commanded by a coaxial annular section hydraulic cylinder (10); means to prevent said spindle (7) from rotating around its own axis with respect to said frame (1);
  the second of two chuckhead quills, contra-positioned exactly coaxially to the first quill (4) and rotatably mounted to a strong support element (18), which is slidably mobile on guide columns (17) in a direction parallel to its axis and which is slidably commanded up and down said guide columns (17) by action of a powerful annular section hydraulic jack (23), whose body is fixedly connected to said guide columns (17); a second toolhead spindle (21) is provided, being disposed coaxially and housed internally to said second quill (20), and being freely rotating with respect to it and slidably commanded by a second coaxial hydraulic cylinder (24); means to prevent rotation of said spindle (21) around its own axis with respect to said frame (1);
  a plurality of mobile cross-sliding tool rests (27) which are slidably mounted on fixed slides (28) on said frame; the two facing ends of said quills (4) and (20) being capable of receiving two hollow chucks (35) and (36) which during operation will be pressed one against the other.

2. Machine tool as in claim 1, said frame (1) comprising a deck (2), standing on the floor on sturdy posts (16), having centrally positioned and mounted to its bottom surface a support (3) on which is rotatably mounted said first quill (4); having also on its top surface the three guide columns (17) which at their bottom ends are fixed to said deck (2) and are constituted of three parallel columns disposed as in the corners of an equilateral triangle, at equal distances from said axis.

3. Machine tool as in claim 1, wherein said cross-sliding tool rests (27) are mobile and slidable on said slides (28), which are fixedly mounted to said frame (1) in radial directions with respect to the common axis of said shafts (4) and (20).

4. Machine tool as in claim 1, wherein the top end of said first toolhead spindle (7), able to bear a tool or toolhead, is located in proximity to the top end of the quill (4) and is rotatably housed inside a sleeve (8) which is free to slide axially inside said quill (4); said toolhead spindle (7) is secured to the tubular stem (9) of said hydraulic cylinder (10); means to prevent rotation of said toolhead spindle (7) with respect to the frame (1) comprising a sliding pair permitting of free axial sliding, arranged between the bottom end of the toolhead spindle (7) and a coaxial sliding seat (15) shaped into a body fixed to said cylinder (15), which in turn is solidly mounted to the support (3) having said first quill (4) rotatably mounted to it.

5. Machine tool as in claim 1, wherein the bottom end of said second toolhead spindle (21), able to bear a tool or toolhead, is located in proximity to the bottom end of said second quill (20) and is rotatably housed inside a sleeve which is free to slide axially inside said second quill (20); the top end of said toolhead spindle (21) is secured to the tubular stem of said second hydraulic cylinder (24); means to prevent rotation of said toolhead spindle (21) with respect to the frame (1) comprising a sliding pair (26) permitting of free axial sliding between same spindle (21) and coaxial tubular element (25) by means of which the body of said second cylinder (24) is coaxially fixed to the body of said hydraulic jack (23).

6. Machine tool as in claim 3, wherein said cross-sliding tool rests (27) are slidably commanded along the respective slides (28) by hydraulic cylinders (29); each toolrest (27) bearing a toolhead or turret (30) rotatable around a parallel axis to the axis of said quills (4) and (20); pneumatic or hydraulic means to produce rotation of said toolhead or turret (30) around its axis.

7. Machine tool as in claim 6, wherein each said toolhead or turret (30) can bear at least one tool (34) which is freely rotating on a pivot (31) parallel to the rotation axis of same toolhead or turret (30).

8. Machine tool as in claim 7, wherein said rotatable tool (34) comprises a roll-forming tool.

9. Machine tool as in claim 7, wherein said rotatable tool (34) comprises a circular cutter.

10. Machine tool as in claim 1, having at the top end of said first quill (4) a first hollow chuck (35) equipped with a self-centering three-jaw device (38) for the external gripping of the blank; said self-centering device (38) being activated through the axial movements of a centering piece (39) attached to the end of the toolhead spindle (7), which interacts directly with the jaws of the self-centering device (38); at the bottom end of said second quill (20) a second hollow chuck (36) is mounted, around which a coaxial annular mobile element (41) is externally and coaxially positioned: this element is pushed in a downward direction by the pressure of a spring (42).

* * * * *